United States Patent Office 3,025,260
Patented Mar. 13, 1962

3,025,260
CONDENSATION PRODUCTS AND THEIR MANUFACTURE
Wolfhard Luck, Koln-Stammheim, and Gustav Mauthe, Opladen, Germany, assignors to Farbenfabriken Bayer Aktiengesellschaft, Leverkusen, Germany, a corporation of Germany
No Drawing. Filed July 7, 1959, Ser. No. 825,407
Claims priority, application Germany July 23, 1958
6 Claims. (Cl. 260—43)

This present invention relates to and has as its objects new and useful resinous condensation products of aromatic polycyclic hydrocarbons, with condensed nuclei aryloxy fatty acids and oxo compounds. These resin-like mixed condensation products are water-soluble in the form of their alkali metal, ammonium or amine salts.

These mixed condensation products are obtainable by condensation of aromatic hydrocarbons having condensed benzene nuclei, particularly naphthalene, alkyl- or alkoxy-naphthalenes, with oxo compounds, particularly formaldehyde or substances yielding formaldehyde, and with aryloxy fatty acids which contain hydrogen atoms in the nucleus capable of reacting with oxo compounds. This condensation is carried out in the presence of acid condensation agents, preferably in an aqueous medium and expediently at an elevated temperature.

Naphthalene, phenanthrene or anthracene are, for example, aromatic hydrocarbons with condensed benzene nuclei which may be used for this process as defined by this invention. However, naphthalene or naphthalenes substituted by alkyl or alkoxy groups such as 1-methyl-naphthalene, 1-ethyl-naphthalene, 2-methyl-naphthalene, 2-ethyl-naphthalene and the like or 1-methoxy-naphthalene, 1-ethoxy-naphthalene, 2-methoxy-naphthalene, 2-ethoxy-naphthalene and the like are preferably used.

Aryloxy fatty acids which may be used for the process according to the invention are, in particular, phenoxy acetic acid or also, for example, $\alpha$-phenoxy-propionic acid and $\alpha$-naphthoxy-acetic acid. In addition to hydrogen atoms which react with oxo compounds, the aryloxy fatty acids may contain alkyl or alkoxy groups or halogen atoms such as chlorine or bromine in the aromatic nucleus. Formaldehyde or a compound yielding formaldehyde such as paraformaldehyde, hexamethylene-tetramine or methylal, are preferably used as oxo compounds. Acid condensation agents are, for example, sulphuric acid, phosphoric acid, zinc chloride and, in particular, hydrochloric acid.

The proportions of the reaction partners to be reacted with one another may vary within wide limits. Usually 0.5 to 3 mols, but preferably not more than about 2 mols of an aromatic hydrocarbon with condensed benzene nuclei are used per mol of aryloxy fatty acid. Per mol of aromatic hydrocarbon with condensed benzene nuclei and per mol of aryloxy fatty acid, between 0.3 and 2 mols, but preferably at least between about 0.75 mol and 1.5 mols each of formaldehyde is used. The more formaldehyde, referred to the amount of aromatic compounds, is used, the more rapidly the condensation proceeds and the more viscous are the aqueous solutions of the reaction products obtained in the form of their salts.

The condensation is advantageously carried out in an aqueous medium and expediently at an elevated temperature between about 50° and 200° C. Advantageously the reaction proceeds at the reflux temperature of the mixture used. The condensation products separate out in the course of the reaction as more or less viscous masses. The reaction has to be terminated, before the separated resins are insoluble or only sparingly soluble in an ammonia or sodium carbonate solution. The condensation may also be effected with the addition of or only in an inert organic solvent such as glacial acetic acid or benzene, or also without the addition of water or solvents in the melt.

Depending on the type and duration of the reaction, the reaction products are highly viscous or brittle resins which are water-soluble in the form of their alkali metal, ammonium or amine salts. These salts are obtainable by dissolving the resins in a calculated amount of a solution of sodium hydroxide, sodium carbonate, sodium bicarbonate, ammonia or of a water-soluble amine. The resins are precipitated from these aqueous solutions by salts of polyvalent metals, for example aluminium, chromium, or zirconyl salts, or by acids such as N-acetic acid.

The condensation products produced according to the invention may be used as impregnating or finishing agents in the form of their water-soluble alkali metal or ammonium salts. They are particularly suitable in this form for the treatment of leather which has been tanned with mineral tanning agents. Chromium leathers are drummed, for example, with aqueous solutions of the alkali metal or ammonium salts of condensation products obtained according to the invention. The products are rapidly taken up by the leather and precipitated in situ by the acids and chromium tanning agents present in the leather. Acids or chromium salts may be added during or after this treatment, if desired. Very full leathers with firm grain are thus obtained. It is an advantage that in contrast to after-treatment of chromium leathers with synthetic or vegetable tanning agents, the characteristic properties of chromium leather are not influenced or only to a small extent by an after-treatment with the resins produced in the form of their water-soluble salts according to the invention.

The following examples are given for the purpose of illustrating but not limiting the invention.

*Example 1*

152 parts by weight of phenoxy acetic acid, 128 parts by weight of naphthalene, 200 parts by weight of a 30% (wt.) formaldehyde solution and 300 parts by weight of 37% (wt.) hydrochloric acid are warmed with stirring and then heated to reflux-temperature for 5 hours. During the condensation a resin separates which becomes more and more viscous. After completion of the reaction, the separated resin is isolated while it is hot and washed with hot water. The resin may then be dissolved for example at boiling temperature in an equivalent amount of sodium hydroxide solution or aqueous ammonia and the unreacted naphthalene (about 5 to 10% of the amount employed) blown off with steam. The resin can be precipitated from this solution by acids, for example N-acetic acid, or salts of polyvalent metals, for example chromium chloride. The product is particularly suitable, for example, in the form of the sodium salt for the after-treatment of chromium leather.

*Example 2*

76 parts by weight of phenoxy-acetic acid, 128 parts by weight of naphthalene, 150 parts by weight of a 30% (wt.) formaldehyde solution and 300 parts by weight of 37% (wt.) hydrochloric acid are warmed with stirring and then refluxed for 14 hours. The resin can be dissolved in a calculated amount of sodium hydroxide solution as described in Example 1. An approximately 20% solution of the sodium salts is highly viscous. A resin purified by dissolution in sodium hydroxide solution and re-precipitation from acids has an acid number of 150.

*Example 3*

152 parts by weight of phenoxyacetic acid, 142 parts by weight of 1-methylnaphthalene, 200 parts by weight of a 30% (wt.) formaldehyde solution and 200 parts by weight of 37% (wt.) hydrochloric acid are warmed with stirring and then under refluxed for 6 hours. The resin separating during the reaction and being brittle in the cold is soluble clearly in dilute aqueous ammonia.

*Example 4*

152 parts by weight of phenoxyacetic acid, 158 parts by weight of 2-methoxynaphthalene, 200 parts by weight of a 30% (wt.) formaldehyde solution and 300 parts by weight of 37% (wt.) hydrochloric acid are warmed and heated with stirring to the boil under reflux for about 30 minutes. A resin separates which is highly viscous in the hot and can be dissolved in dilute sodium hydroxide solution, sodium carbonate solution, aqueous ammonia or aqueous solutions of aliphatic amines.

*Example 5*

The process is carried out as described in Example 4, but the phenoxy-acetic acid is replaced by 188 parts by weight of 2-chloro-phenoxyacetic acid, and the 2-methoxy-naphthalene by 128 parts by weight of naphthalene. After heating the reaction mixture to boiling, it is refluxed with stirring for 12 hours. The resin separating dissolves clearly in, e.g., dilute ammonia solution.

*Example 6*

152 parts by weight of phenoxyacetic acid, 128 parts by weight of naphthalene, 60 parts by weight of paraformaldehyde and 300 parts by weight of 37% (wt.) hydrochloric acid are warmed together and the mixture is heated with stirring to the boil under reflux for 2 hours. The reaction product can be dissolved in, for example, sodium hydroxide solution with simultaneous or subsequent removal of unreacted naphthalene (5 to 10% of the amount employed).

We claim:

1. A condensation product obtained by reacting 0.5 to 3 mols of a polycyclic compound selected from the group consisting of naphthalene, lower alkyl naphthalenes wherein said lower alkyl is the only substituent, and lower alkoxy naphthalenes wherein said lower alkoxy is the only substituent, one mol of a member selected from the group consisting of a phenoxy lower fatty acid and a naphthoxy lower fatty acid and 0.6 to 4 mols formaldehyde at a temperature between 50–200° C.

2. A condensation product obtained by reacting about 2 mols of a member selected from the group consisting of naphthalene, lower alkyl naphthalenes wherein said lower alkyl is the only substituent, and lower alkoxy naphthalenes wherein said lower alkoxy is the only substituent with 1 mol of a member selected from the group consisting of a phenoxy lower fatty acid and a naphthoxy lower fatty acid and 1.5 to 3 mols formaldehyde at a temperature between 50–200° C. in contact with a strong acid catalyst.

3. A condensation product obtained by reacting about 2 mols of naphthalene, 1 mol of phenoxy acetic acid, and 1.5 to 3 mols formaldehyde at a temperature between 50° to 200° C. in contact with hydrochloric acid.

4. A condensation product obtained by reacting about 2 mols of 1-methyl-naphthalene, 1 mol of phenoxy acetic acid and 1.5 to 3 mols formaldehyde at a temperature between 50° to 200° C. in contact with hydrochloric acid.

5. A condensation product obtained by reacting about 2 mols of 2-methoxy-naphthalene, 1 mol of phenoxy acetic acid and 1.5 to 3 mols formaldehyde at a temperature between 50° to 200° C. in contact with hydrochloric acid.

6. A condensation product obtained by reacting about 2 mols of naphthalene, 1 mol of 2-chlor-phenoxy acetic acid and 1.5 to 3 mols formaldehyde at a temperature between 50° to 200° C. in contact with hydrochloric acid.

References Cited in the file of this patent

UNITED STATES PATENTS

| | | |
|---|---|---|
| 2,147,547 | Reiff et al. | Feb. 14, 1939 |
| 2,597,159 | May et al. | May 20, 1952 |
| 2,729,607 | Haagen | Jan. 3, 1956 |
| 2,825,712 | Witzel | Mar. 4, 1958 |